United States Patent
Kobayashi (10) Patent No.: US 10,573,923 B2
(45) Date of Patent: Feb. 25, 2020

(54) NONAQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventor: Keiichiro Kobayashi, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 863 days.

(21) Appl. No.: 14/932,223

(22) Filed: Nov. 4, 2015

(65) Prior Publication Data
US 2016/0126586 A1    May 5, 2016

(30) Foreign Application Priority Data
Nov. 4, 2014    (JP) ................................ 2014-224725

(51) Int. Cl.
*H01M 2/02*        (2006.01)
*H01M 10/0525*    (2010.01)
*H01M 10/0587*    (2010.01)

(52) U.S. Cl.
CPC ..... *H01M 10/0525* (2013.01); *H01M 2/0217* (2013.01); *H01M 2/0237* (2013.01); *H01M 10/0587* (2013.01)

(58) Field of Classification Search
None
See application file for complete search history.

(56) References Cited

U.S. PATENT DOCUMENTS

| | | | |
|---|---|---|---|
| 2006/0099504 A1* | 5/2006 | Kim | H01M 2/027 429/176 |
| 2010/0203373 A1 | 8/2010 | Kawase et al. | |
| 2011/0059344 A1 | 3/2011 | Kawase et al. | |
| 2011/0086265 A1* | 4/2011 | Suzuki | H01M 2/0267 429/186 |
| 2013/0309533 A1 | 11/2013 | Nakamura | |
| 2015/0357670 A1* | 12/2015 | Yamafuku | H01M 10/0431 429/56 |

FOREIGN PATENT DOCUMENTS

| | | |
|---|---|---|
| CN | 103427052 A | 12/2013 |
| JP | 2006-278245 A | 10/2006 |
| JP | 2009-026704 A | 2/2009 |
| JP | 2013161632 A | 8/2013 |

(Continued)

OTHER PUBLICATIONS

Miyazaki et al. (JP 2013239433 A)—Abstract Translation.*

*Primary Examiner* — Haixia Zhang
(74) *Attorney, Agent, or Firm* — Sughrue Mion, PLLC (57) ABSTRACT

Provided is a nonaqueous electrolyte secondary battery in which a flat wound electrode body, a nonaqueous electrolytic solution, and an insulating film are accommodated in a quadrilateral battery case. The insulating film is formed into a bag shape corresponding to a shape of the electrode body and is arranged between an inner wall of the battery case and the electrode body. An entire surface of a bottom-side R portion of two R portions of the electrode body, which faces a bottom surface of the battery case, and an inside of the bag-shaped insulating film, which faces the bottom-side R portion of the electrode body, are joined to each other.

1 Claim, 8 Drawing Sheets

(56) References Cited

FOREIGN PATENT DOCUMENTS

| | | | |
|---|---|---|---|
| JP | 2013239433 A | * 11/2013 | ........ H01M 10/0431 |
| JP | 2013-251119 A | 12/2013 | |
| JP | 2015-041589 A | 3/2015 | |
| KR | 2011-0005852 A | 1/2011 | |
| WO | 2015/025209 A1 | 2/2015 | |

* cited by examiner

NONAQUEOUS ELECTROLYTE SECONDARY BATTERY AND METHOD OF MANUFACTURING THE SAME

INCORPORATION BY REFERENCE

The disclosure of Japanese Patent Application No. 2014-224725 filed on Nov. 4, 2014 including the specification, drawings and abstract is incorporated herein by reference in its entirety.

BACKGROUND OF THE INVENTION

1. Field of the Invention

The present invention relates to a battery (nonaqueous electrolyte secondary battery) including a nonaqueous electrolytic solution and a method of manufacturing the same.

2. Description of Related Art

The importance of nonaqueous electrolyte secondary batteries such as a lithium ion secondary battery has increased as a power supply, for example, a vehicle-mounted power supply or a power supply for a PC, a portable device, or the like. In particular, a lithium ion secondary battery is preferably used as a vehicle-mounted power supply with high output because it is light-weight and has high energy density. As a structure of such a battery, a battery structure is known including a nonaqueous electrolytic solution and a wound electrode body in which a sheet-shaped positive electrode and a sheet-shaped negative electrode are laminated and wound together with a separator. From the viewpoint of obtaining high physical strength, a metal case is used as a battery case. In this case, typically, an electrode body is covered with an insulating film to insulate the battery case and the electrode body from each other. For example, Japanese Patent Application Publication No. 2006-278245 (JP 2006-278245 A) and Japanese Patent Application Publication No. 2009-026704 (JP 2009-026704 A) discloses batteries including an electrode body and a battery case, in which an insulating film is arranged between the electrode body and the battery case.

In the nonaqueous electrolyte secondary battery having the above-described configuration, a space between the positive electrode and the negative electrode (that is, an internal space of an electrode body) is filled with an appropriate amount of a nonaqueous electrolytic solution to realize the smooth movement of charge carriers between the electrodes. Therefore, when the liquid volume of the nonaqueous electrolytic solution held in (impregnated into) the electrode body is lower than a necessary volume (that is, when liquid shortage occurs), charge-discharge performance may deteriorate. For example, the shortage of the nonaqueous electrolytic solution may cause a decrease in cycle characteristics (a decrease in cycle characteristics caused by high-rate charging and discharging). Therefore, when the nonaqueous electrolyte secondary battery is used for an application in which charging and discharging are repeated at high input and output densities (for example, a vehicle-mounted battery in which high-rate charging and discharging is repeated) or for an application in which it is required that high battery performance can be exhibited for a long period of time (an application in which a long lifetime is required; for example, a vehicle-mounted battery which is generally used for 10 years or longer), it is strongly desired to prevent the shortage of the nonaqueous electrolytic solution.

In a nonaqueous electrolyte secondary battery in which a wound electrode body having a flat shape in a section perpendicular to a winding axis is accommodated in a quadrilateral battery case, a gap may be formed between a bottom-side R portion of the wound electrode body and a corner portion of the bottom of the battery case. From the viewpoint of impact resistance, the electrode body may be arranged in the battery case such that the top of the bottom-side R portion of the electrode body is separated from the bottom of the battery case. However, even with the above-described configuration, a gap is formed between the bottom-side R portion of the electrode body and the bottom of the battery case. The nonaqueous electrolytic solution held in this gap is not used for a cell reaction (movement of charge carriers between the electrodes). The nonaqueous electrolytic solution impregnated into the electrode body during battery construction may flow out from the electrode body during use of the battery. For example, electrode active materials contained in the positive electrode and the negative electrode may expand and contract due to repeated charging and discharging (in particular, high-rate charging and discharging) which forces the nonaqueous electrolytic solution outward from the inside of the electrode body. When the nonaqueous electrolytic solution flowing out from the electrode body is held in a gap between the bottom-side R portion of the wound electrode body and the bottom of the battery case, the amount of the nonaqueous electrolytic solution held in (impregnated into) the electrode body may be insufficient.

SUMMARY OF THE INVENTION

The invention provides a nonaqueous electrolyte secondary battery in which cycle characteristics (in particular, high-rate cycle characteristics) are superior by improving performance of holding a nonaqueous electrolytic solution in an electrode body (hereinafter, also referred to as "liquid holding ability of an electrode body)".

According to a first aspect of the invention, there is provided a nonaqueous electrolyte secondary battery including: a flat wound electrode body; a nonaqueous electrolytic solution; a quadrilateral battery case that accommodates the electrode body and the nonaqueous electrolytic solution; and an insulating film that electrically insulates the electrode body and the battery case from each other. The insulating film is formed into a bag shape corresponding to a shape of the electrode body and is arranged between an inner wall of the battery case and the electrode body. The wound electrode body is formed by making an elongated positive electrode and an elongated negative electrode overlap each other with an elongated separator interposed therebetween to obtain a laminate and winding the laminate in a longitudinal direction of the elongated positive electrode and the elongated negative electrode. The wound electrode body has two R portions and a flat portion, the two R portions have a curved surface and are formed in opposite end portions in a longitudinal direction of a section perpendicular to a winding axis, and the flat portion is a center portion in the longitudinal direction of the section and is interposed between the two R portions. An entire surface of the bottom-side R portion of the two R portions of the electrode body, which faces a bottom surface of the battery case, and an inside of the bag-shaped insulating film, which faces the bottom-side R portion of the electrode body were joined to each other.

According to the above-described configuration, the inside of the bag-shaped insulating film which faces the bottom-side R portion of the electrode body is joined to the entire surface of the bottom-side R portion of the electrode body. Therefore, the nonaqueous electrolytic solution is not likely to be held in a gap between the bottom-side R portion of the electrode body and the bottom of the battery case. Thus, even when the nonaqueous electrolytic solution impregnated into the electrode body flows out from the electrode body, the nonaqueous electrolytic solution can be easily supplied into the electrode body again. In other words, according to the above-described configuration, the liquid holding ability of the electrode body is improved, and the liquid shortage in the electrode body can be prevented. That is, according to the invention, a nonaqueous electrolyte secondary battery having superior cycle characteristics (in particular, high-rate cycle characteristics) can be provided. The nonaqueous electrolytic solution supplied into the battery case can be supplied (impregnated) into the electrode body without being held in a gap between the bottom-side R portion of the electrode body and the bottom of the battery case. Therefore, the amount of the nonaqueous electrolytic solution (in particular, a nonaqueous solvent constituting the nonaqueous electrolytic solution) used can be reduced. According to the above-described configuration, since the insulating film is joined to the electrode body, the insulating film is not likely to deviate from a predetermined position. For example, the following situations can be prevented including: a position deviation of the insulating film which may occur when the electrode body accommodated in the insulating film is inserted into the battery case; and a situation in which the insulating film falls to the bottom of the battery case due to gravity after the electrode body accommodated in the insulating film is accommodated in the battery case. That is, an electrode or a conductive member (typically, a positive electrode current collector terminal, a negative electrode current collector terminal, or the like) can be prevented from being exposed due to the position deviation of the insulating film. As a result, internal short-circuiting, which may occur due to contact between the battery case and the exposed conductive member or the like, can be prevented. According to the above-described configuration, poor welding, which may occur by inserting the positionally deviated insulating film into a welded portion of the battery case (between a case body and a lid of the battery case), can be prevented.

The entire surface of the bottom-side R portion of the electrode body and the inside of the bag-shaped insulating film which faces the bottom-side R portion of the electrode body may be joined to each other through welding of the insulating film. Alternatively, the entire surface of the bottom-side R portion of the electrode body and the inside of the bag-shaped insulating film which faces the bottom-side R portion of the electrode body may be joined to each other through an adhesive member or a bonding member. According to the above-described configuration, the entire surface of the bottom-side R portion of the electrode body and the insulating film which faces the bottom-side R portion of the electrode body can be reliably joined to each other.

According to a second aspect of the invention, there is provided a method of manufacturing a nonaqueous electrolyte secondary battery, the nonaqueous electrolyte secondary battery including a flat wound electrode body, a quadrilateral battery case that accommodates the electrode body and a nonaqueous electrolytic solution, and an insulating film that electrically insulates the electrode body and the battery case from each other.

This manufacturing method includes:

(i) a step of constructing the flat wound electrode body by making an elongated positive electrode and an elongated negative electrode overlap each other with an elongated separator interposed therebetween to obtain a laminate and winding the laminate in a longitudinal direction of the elongated positive electrode and the elongated negative electrode, in which the electrode body has two R portions and a flat portion, the two R portions have a curved surface and are formed in opposite end portions in a longitudinal direction of a section perpendicular to a winding axis, and the flat portion is a center portion in the longitudinal direction of the section and is interposed between the two R portions;

(ii) a step of accommodating the constructed electrode body in a bag-shaped insulating film and joining an entire surface of one of the two R portions of the electrode body and an inside of the bag-shaped insulating film, which faces the R portion of the electrode body, to each other;

(iii) a step of inserting the electrode body, to which the insulating film is joined, into the battery case such that one of the two R portions of the electrode body, to which the insulating film is joined, faces a bottom surface of the battery case; and (iv) a step of injecting the nonaqueous electrolytic solution into the battery case into which the electrode body and the insulating film are inserted.

According to this manufacturing method, a quadrilateral nonaqueous electrolyte secondary battery can be suitably manufactured which includes the electrode body accommodated in the bag-shaped insulating film, in which the insulating film which faces the bottom-side R portion is joined to the entire surface of the bottom-side R portion of the of the electrode body. That is, since the bottom-side R portion of the electrode body and the insulating film are joined to each other before the electrode body is inserted into the battery case, the joining can be easily performed. By joining the bottom-side R portion of the electrode body and the insulating film to each other in advance, a position deviation of the insulating film, which may occur when the electrode body accommodated in the insulating film is accommodated in the battery case, can be prevented.

The insulating film may be welded to the electrode body by heating a joint portion between the R portion of the electrode body and the insulating film to at least 60° C. or higher while applying a pressing force of at least 950 N to the joint portion. When the heating temperature and the pressing force are as described above, the electrode body and the insulating film can be reliably joined (welded) to each other.

The insulating film and the R portion of the electrode body may be joined to each other through an adhesive force or a bonding force of an adhesive member or a bonding member that is arranged between the insulating film and the electrode body. According to the manufacturing method, when the electrode body and the insulating film are joined to each other, heat and pressing force applied to the electrode body and the insulating film can be reduced. According to the manufacturing method, the invention is also suitably applicable to a case where the insulating film is formed of a material which is unsuitable for welding.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, preferred embodiments of the invention will be described appropriately with reference to the drawings. Matters necessary to implement the embodiments of the invention other than those specifically referred to in the invention may be understood as design matters based on the related art in the pertinent field for a person of ordinary skill in the art. The invention can be practiced based on the contents disclosed in this description and common technical knowledge in the subject field. In addition, in the following drawings, parts or portions having the same function are represented by the same reference numerals, and the repeated description thereof will not be made or will be simplified. In each drawing, a dimensional relationship (for example, length, width, or thickness) does not necessarily reflect the actual dimensional relationship.

"Secondary battery" described in this specification refers to general storage devices which can be repeatedly charged and discharged and is a collective term for storage elements including so-called storage batteries such as a lithium ion secondary battery and electric double layer capacitors. In addition, "nonaqueous electrolyte secondary battery" refers to batteries including a nonaqueous electrolytic solution (typically, an electrolytic solution containing a supporting electrolyte in a nonaqueous solvent). In addition, "lithium ion secondary battery" refers to a secondary battery in which lithium ions are used as charge carriers, and charging and discharging are performed by electrons moving between positive and negative electrodes along with the lithium ions. In addition, an electrode active material refers to a material which can reversibly store and release chemical species (lithium ions in a lithium ion secondary battery) as charge carriers. Hereinafter, a structure of the battery according to the invention will be described in detail using a quadrilateral lithium ion secondary battery as an example. However, the invention is not intended to be limited to the embodiments.

In this specification, "adhesion" and "bonding" represent that two objects are joined to each other but are distinguished from each other based on whether the two objects can be peeled off from each other again after being joined to each other. That is, "adhesion" represents that the two objects can be peeled off from each other again after being joined to each other. On the other hand, "bonding" represents that the two objects cannot be peeled off from each other again after being joined to each other.

As shown in FIGS. 1 to 3 and 6, a lithium ion secondary battery 100 according to an embodiment of the invention includes a flat wound electrode body 80, a battery case 30, and an insulating film 10.

<Battery Case 30>

Figure 1:
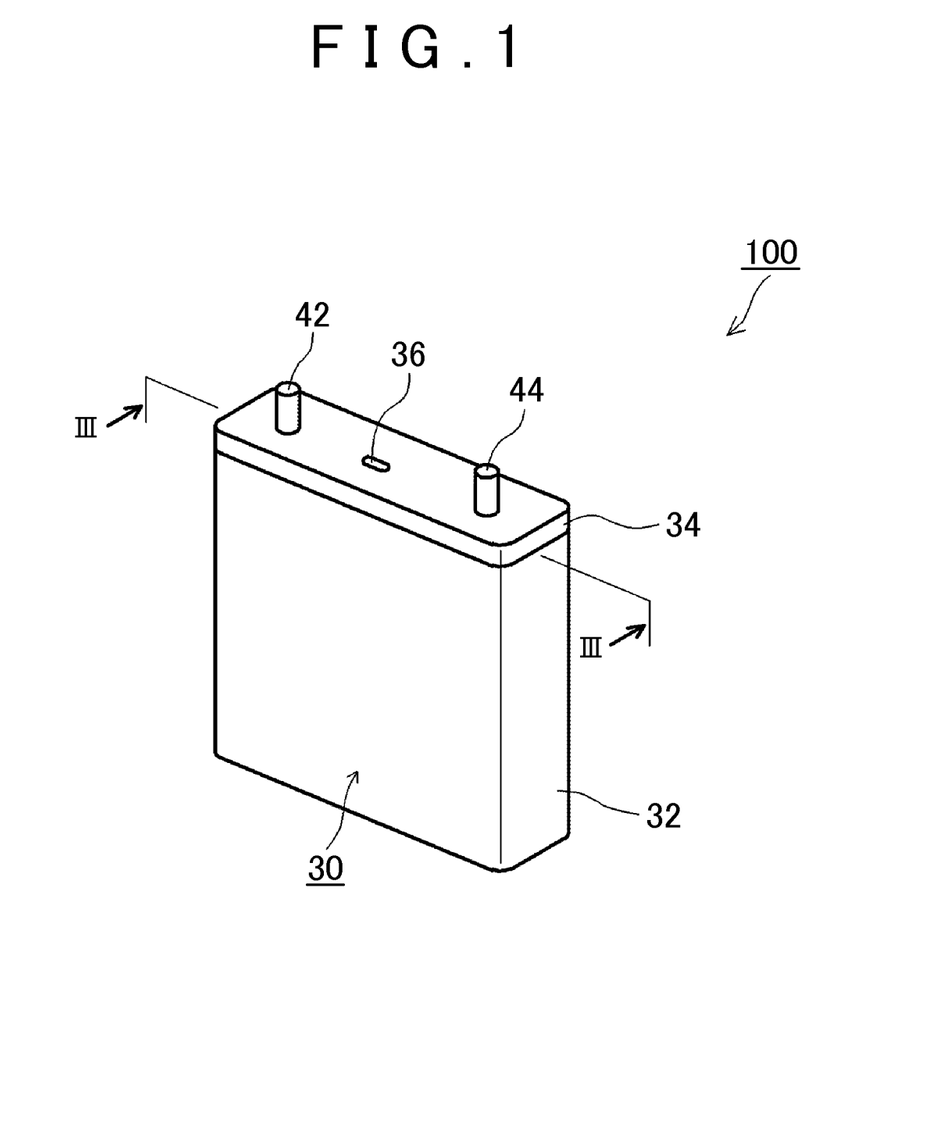
FIG. 1 is a perspective view schematically showing the external appearance of a nonaqueous electrolyte secondary battery according to an embodiment of the invention.
Figure 2:
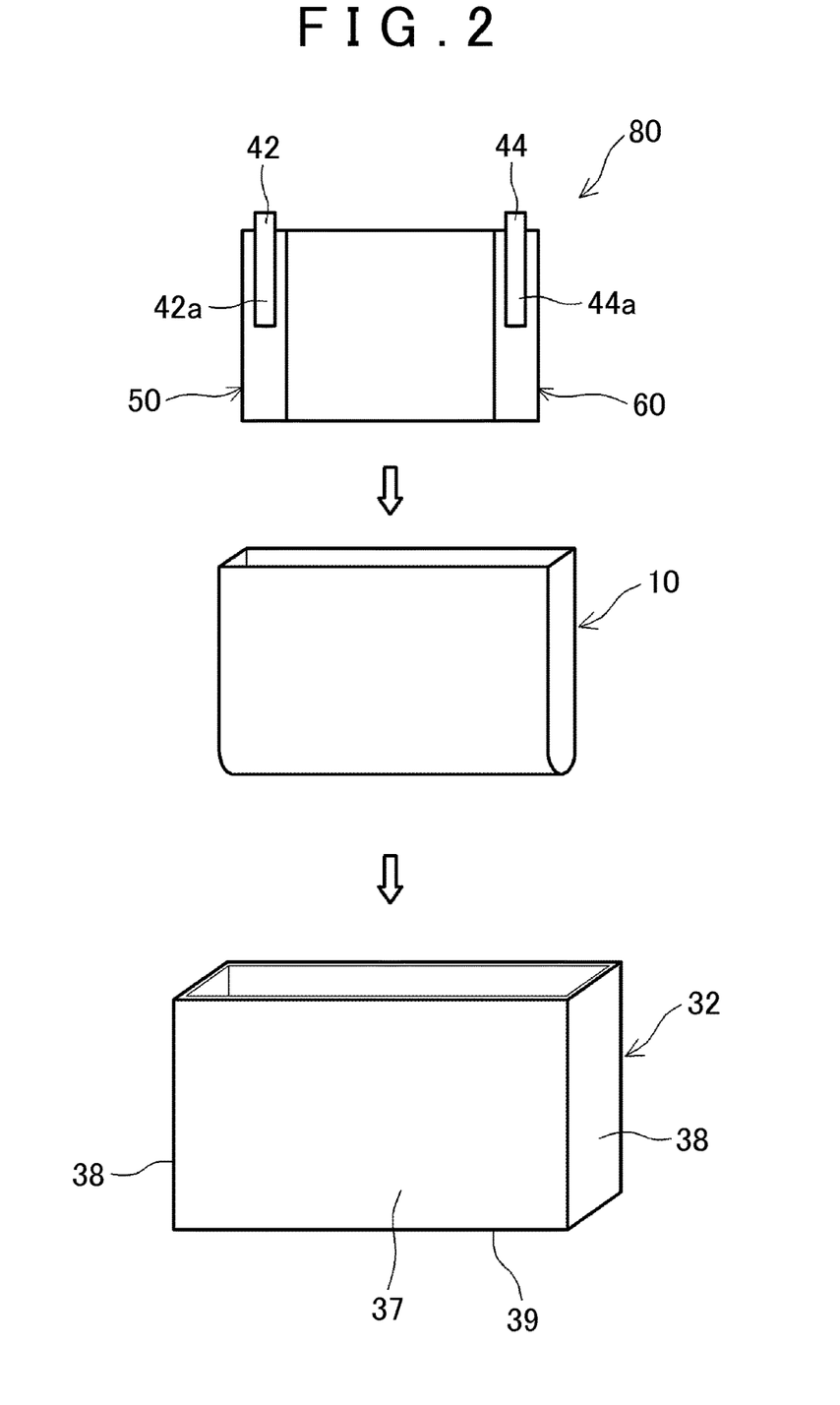
FIG. 2 is an exploded perspective view schematically showing a configuration of the nonaqueous electrolyte secondary battery according to the embodiment.
Figure 3:
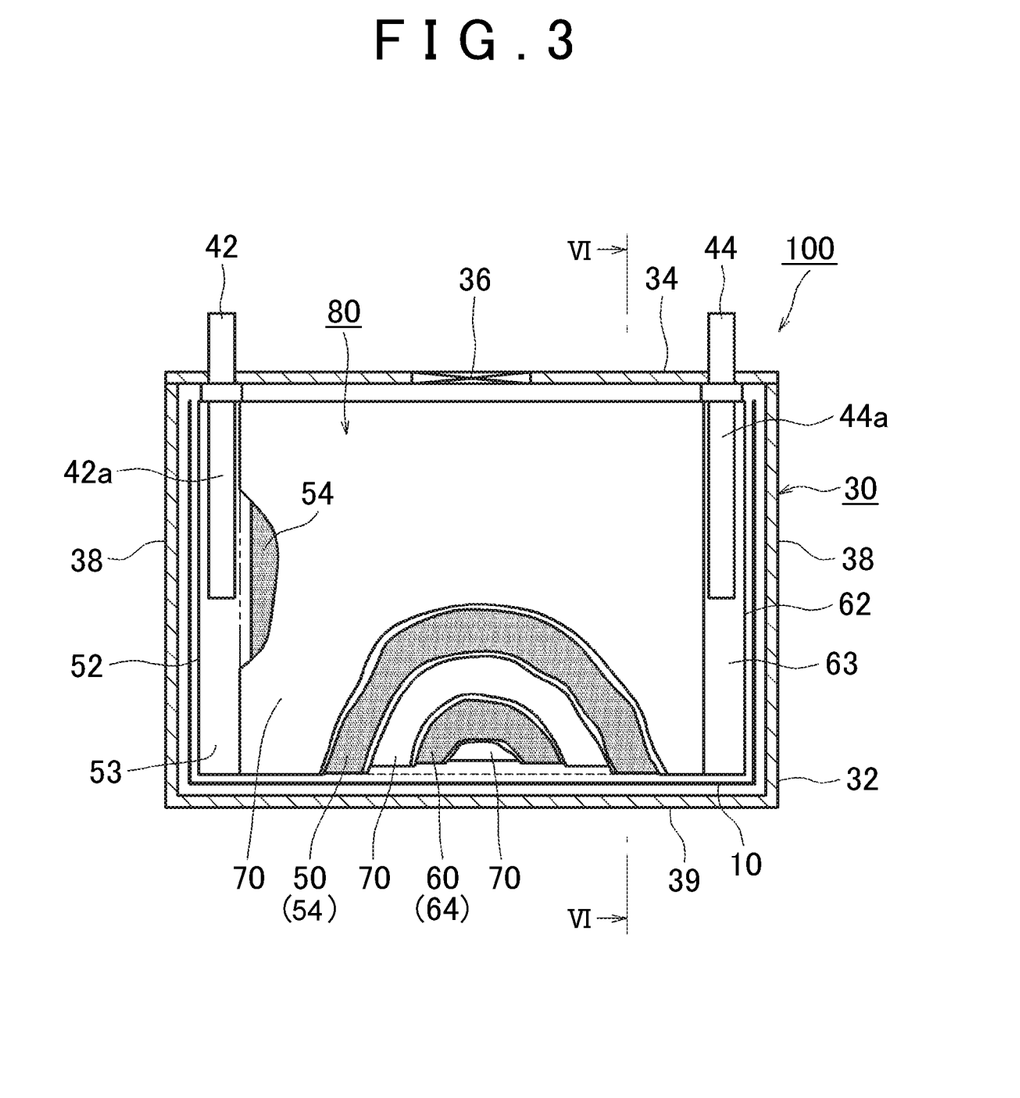
FIG. 3 is a longitudinal sectional view schematically showing a sectional structure taken along line III-III of FIG. 1.
Figure 6:
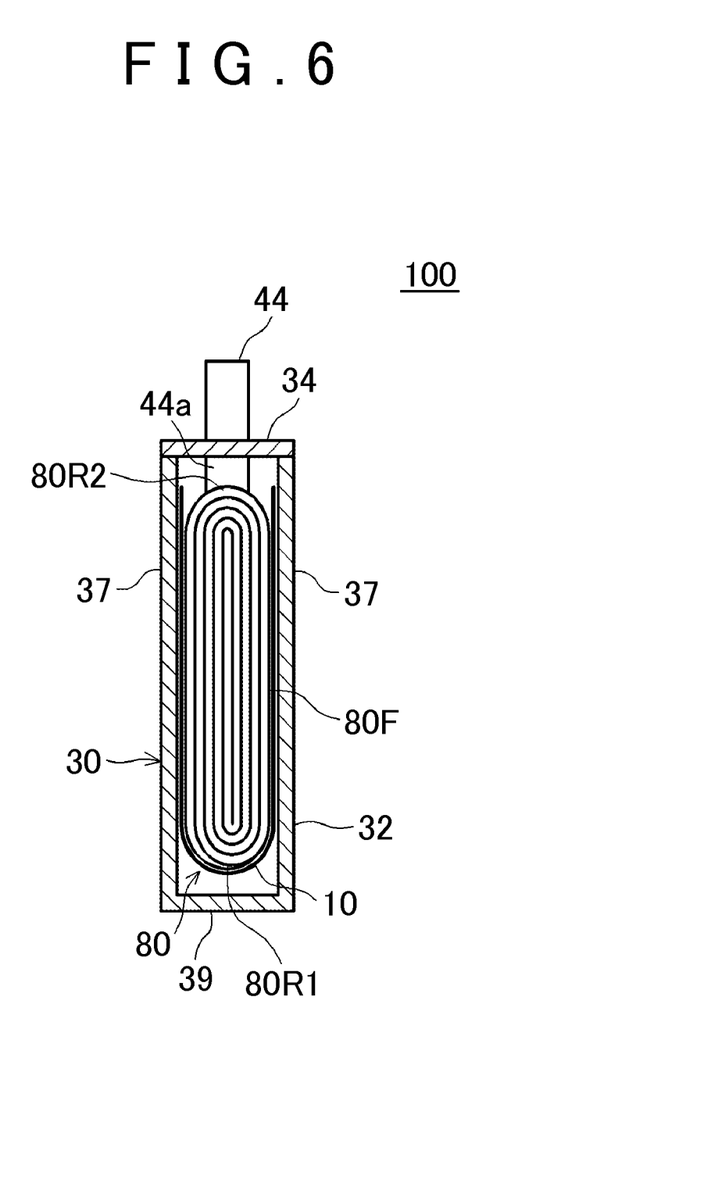
FIG. 6 is a longitudinal sectional view schematically showing a longitudinal sectional structure taken along line VI-VI of FIG. 3.

As shown in FIGS. 1 to 3 and 6, the battery case 30 according to the embodiment is a so-called quadrilateral (typically, a cuboid shape) battery case having 8 corner portions in total which is formed such that an internal space thereof has a box shape corresponding to the wound electrode body 80. The battery case 30 includes a case body 32 and a lid 34. The case body 32 has a bottomed cuboid shape and is a flat box-shaped container having an opening on one surface (top surface). The lid 34 is a member that is attached to the opening (upper opening) of the case body 32 to cover the opening. The case body 32 can accommodate the wound electrode body 80 and the insulating film 10 through the upper opening. As shown in FIGS. 2, 3, and 6, the case body 32 includes: a pair of wide side surfaces 37 that face a flat surface (flat portion) of the wound electrode body 80 to be accommodated in the case; a pair of narrow side surfaces 38 that are adjacent to the wide side surfaces 37; and a bottom surface 39. It is preferable that the battery case 30 is formed of a metal material having high strength, light weight, and high thermal conductivity. Examples of such a metal material include aluminum stainless steel, and nickel-plated steel.

The battery case 30 has a flat rectangular internal space that accommodates the wound electrode body 80. As shown in FIGS. 2 and 3, the flat internal space of the battery case 30 has a width (length in a longitudinal direction of the wide side surfaces 37) which is slightly wider than that of the wound electrode body 80. As shown in FIGS. 1 and 3, a positive electrode terminal 42 and a negative electrode terminal 44 for external connection are attached to the lid 34 of the battery case 30. The positive electrode terminal 42 and the negative electrode terminal 44 penetrate the battery case 30 (lid 34) and protrude from the battery case 30 to the outside. A thin safety valve 36, which is set to release the internal pressure of the battery case 30, and an injection hole (not shown), through which the nonaqueous electrolytic solution is injected, are provided on the lid 34.

<Wound Electrode Body 80>

As shown in FIGS. 2 to 6, the wound electrode body 80 is formed by making an elongated positive electrode 50, an elongated negative electrode 60 overlap each other with two elongated separators 70 to obtain a laminate and winding the laminate into a flat shape in a longitudinal direction of the elongated positive and negative electrodes. That is, as shown in the drawings, the flat wound electrode body 80 has two R portions 80R1, 80R2 and a wide flat portion 80F, the two R portions have a curved surface and are formed in opposite end portions in a longitudinal direction of a section perpendicular to a winding axis WL, and the wide flat portion is a center portion in the longitudinal direction of the section and is interposed between the two R portions. As shown in FIGS. 2, 3, and 6, the wound electrode body 80 is accommodated in the battery case 30 (that is, the case body 32) such that the longitudinal direction of the section perpendicular to the winding axis WL is a vertical direction of the battery case (in a posture in which the winding axis WL of the wound electrode body 80 lies sideways that is, the opening of the case body 32 is formed in the normal direction of the winding axis WL of the wound electrode body 80) and such that the R portion 80R1 of the two R portions 80R1, 80R2 faces the bottom surface 39 of the battery case. Hereinafter, the R portion 80R1 of the wound electrode body which faces the bottom surface 39 of the battery case will also referred to as "lower R portion". The lower R portion can be regarded as "bottom-side R portion" of the present invention.

The positive electrode 50, the negative electrode 60, and the separators 70 are elongated (belt-shaped) sheet members, respectively. In the positive electrode 50, a positive electrode active material layer 54 is formed on a single surface or both surfaces (herein, both surfaces) of an elongated (belt-shaped) positive electrode current collector 52 in the longitudinal direction. On one end portion of the positive electrode current collector 52 in a width direction, a portion where the positive electrode current collector 52 is exposed without the positive electrode active material layer 54 being formed in a belt shape along the end portion (that is, a positive electrode active material layer non-forming portion 53) is formed. In the negative electrode 60, a negative electrode active material layer 64 is formed on a single surface or both surfaces (herein, both surfaces) of an elongated negative electrode current collector 62 in the longitudinal direction. On one end portion of the negative electrode current collector 62 in a width direction, a portion where the negative electrode current collector 62 is exposed without the negative electrode active material layer 64 being formed in a belt shape along the end portion (that is, a negative electrode active material layer non-forming portion 63) is formed.

Figure 4:
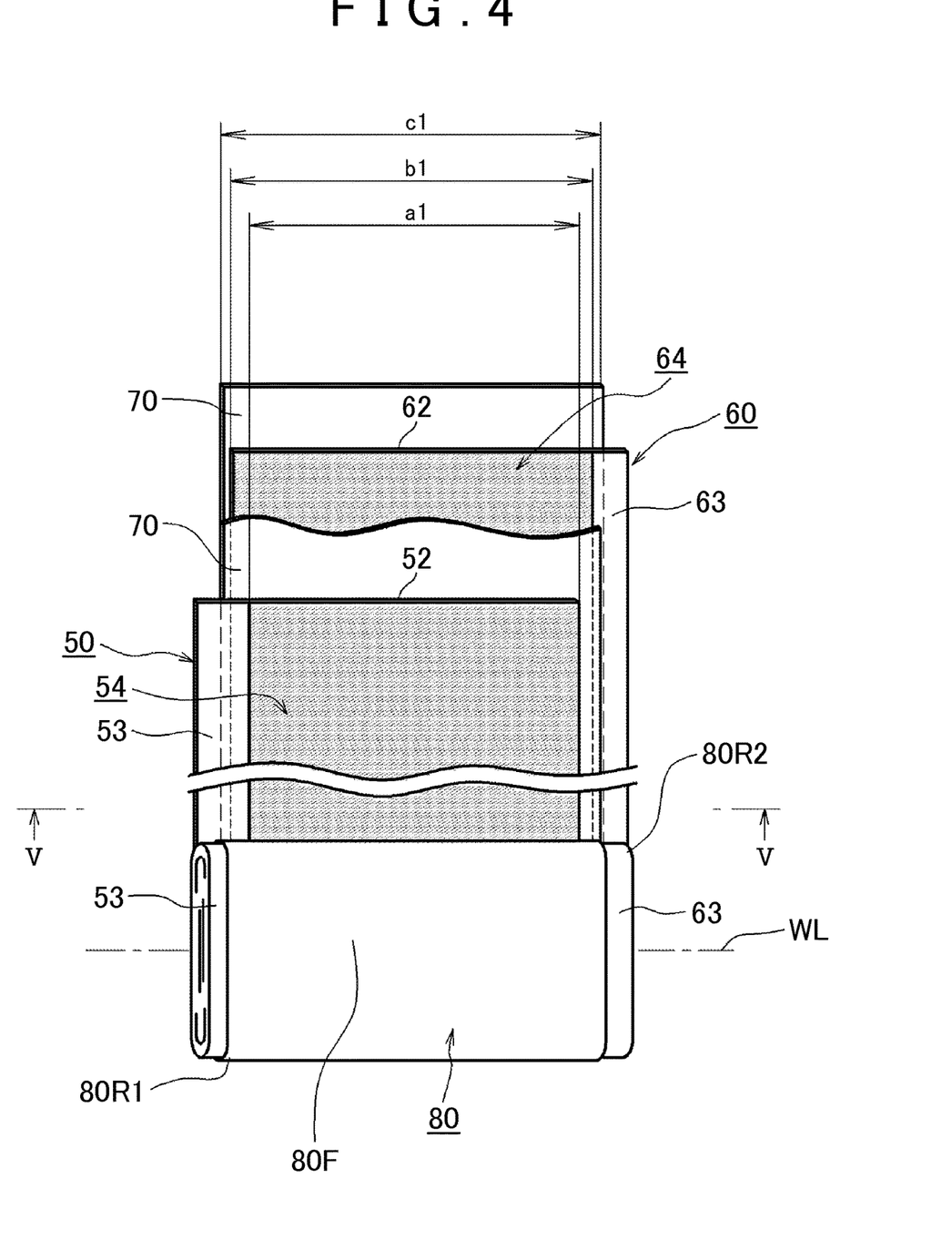
FIG. 4 is a schematic diagram showing a configuration of a wound electrode body according to the embodiment.
Figure 5:
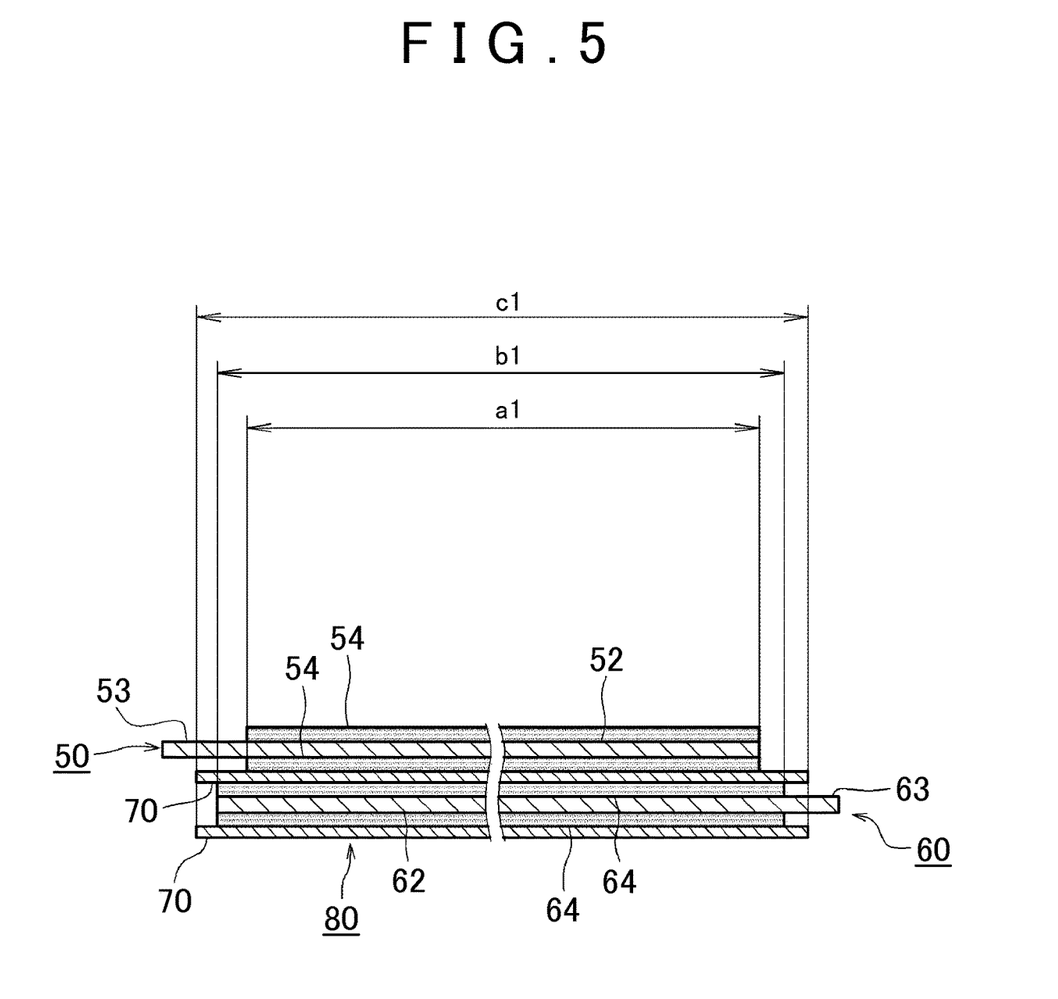
FIG. 5 is an enlarged sectional view of a sectional structure taken along line V-V of FIG. 4, schematically showing a part of a region between positive and negative electrodes of the wound electrode body according to the embodiment.

In the embodiment as shown in FIGS. 4 and 5, the respective active material layers are formed such that a width b1 of the negative electrode active material layer 64 is slightly wider than a width a1 of the positive electrode active material layer 54. Further, a width c1 of the separators 70 is slightly wider than the width b1 of the negative electrode active material layer 64 (c1>b1>a1). The positive electrode 50, the negative electrode 60, and the separators 70 are aligned in the longitudinal direction so as to overlap each other in the following order: the positive electrode 50, the separator 70, the negative electrode 60, and the separator 70. The positive electrode active material layer non-forming portion 53 of the positive electrode 50 and the negative electrode active material layer non-forming portion 63 of the negative electrode 60 protrude to opposite sides in the width direction of the separator 70. The positive electrode 50, the negative electrode 60, and the separators 70 which overlap each other are wound around the winding axis WL set in the width direction. In the embodiment, the positive electrode 50, the negative electrode 60, and the two separators 70 are made to overlap each other, thereby forming the flat wound electrode body 80. As a result, at the center of the wound electrode body 80 in the winding axial direction, the laminate (winding core portion) is formed in which the positive electrode 50, the negative electrode 60, and the separators 70 are laminated and wound.

As shown in FIGS. 2 and 3, the positive electrode active material layer non-forming portion 53 and the negative electrode active material layer non-forming portion 63, which protrude from the winding core portion of the wound electrode body 80, are joined to a positive electrode current collector plate 42a and a negative electrode current collector plate 44a, respectively, so as to be electrically connected to the positive electrode terminal 42 and the negative electrode terminal 44. The positive electrode current collector plate 42a is formed of, for example, aluminum or an aluminum alloy. In this example, as shown in FIG. 3, the positive electrode current collector plate 42a extends to the center of the positive electrode active material layer non-forming portion 53 of the wound electrode body 80. A tip end portion of the positive electrode current collector plate 42a is joined (here, is welded) to the center of the positive electrode active material layer non-forming portion 53. The negative electrode current collector plate 44a is formed of, for example, copper or a copper alloy. In this example, as shown in FIG. 3, the negative electrode current collector plate 44a extends to the center of the negative electrode active material layer non-forming portion 63 of the wound electrode body 80. A tip end portion of the negative electrode current collector plate 44a is joined (here, is welded) to the center of the negative electrode active material layer non-forming portion 63.

<Insulating Film 10>

The insulating film 10 is arranged between the wound electrode body 80 and the battery case 30 so as to separate the wound electrode body 80 and the battery case 30 from each other. Due to this insulating film 10, direct contact between the wound electrode body 80, which is a power generating element, and the battery case 30 can be avoided, and insulation between the wound electrode body 80 and the battery case 30 can be secured. The insulating film 10 may be formed of any material which can function as an insulating member. Typically, it is preferable that the insulating film 10 is formed of a flexible material which can be curved along the shape of the R portion of the wound electrode body 80. For example, a resin material such as polypropylene (PP) or polyethylene (PE) can be preferably used. An insulating film formed of a thermoplastic resin can be preferably used, in particular, when the wound electrode body 80 and the insulating film are joined to each other through welding.

The average thickness of the insulating film 10 may be about 100 µm but can be appropriately changed depending on, for example, construction conditions of the battery 100. For example, the average thickness of the insulating film 10 is 20 µm or more (preferably, 50 µm or more) and 200 µm or less (preferably, 100 µm or less). It is preferable that the thickness of the insulating film 10 is small because the space of the insulating film 10 in the battery case 30 can be minimized when the insulating film 10 is accommodated in the battery case 30 together with the wound electrode body 80. On the other hand, when the thickness of the insulating film is excessively small, the durability of the insulating film may deteriorate, and it may be difficult to secure the insulation between the electrode body 80 and the battery case. The insulating film 10 may have a single-layer structure or a laminate structure including two or more layers within a range where the effects of the invention can be exhibited.

Here, as shown in FIGS. 2, 3, and 6, the insulating film 10 may be formed in a bag shape surrounding the wound electrode body 80. Specifically, the insulating film 10 is formed in a bag shape corresponding to the shape of the wound electrode body 80. The insulating film 10 has a bottomed bag shape having an opening at an upper end, and the wound electrode body 80 can be accommodated in the insulating film 10 through the opening.

As shown in FIGS. 2, 3, and 6, roughly, the bag-shaped insulating film 10 includes: wide side surface-forming portions that form a pair of wide side surfaces facing the wide side surfaces 37 of the battery case 30 (case body 32) (the flat portion 80F of the wound electrode body 80 facing the wide side surfaces); a bottom surface-forming portion that is present between the pair of wide side surface-forming portions and forms a bottom surface of the insulating film 10 facing the bottom surface 39 of the battery case 30 (case body 32) (the R portion 80R1 of the wound electrode body 80 facing the bottom surface 39, that is, the lower R portion);

and narrow side surface-forming portions that are present on opposite sides of the pair of wide side surface-forming portions, respectively, and form a pair of narrow side surfaces facing the narrow side surfaces 38 of the battery case 30 (the case body 32).

The shape of the bottom surface-forming portion (that is, the portion facing the lower R portion of the wound electrode body 80) of the bag-shaped insulating film 10 is not particularly limited and, for example, may be a U-shape, a V-shape, or an inverted C shape. It is preferable that the bottom surface-forming portion (that is, the portion facing the lower R portion of the wound electrode body 80) of the insulating film 10 is bent to have a gently curved shape (U-shape) obtained as shown in FIGS. 2 and 6. It is more preferable that the bottom surface-forming portion has a shape corresponding to (preferably, similar to) the shape of the lower R portion 80R1 of the wound electrode body 80. By forming the shape of the bottom surface-forming portion (that is, the portion facing the lower R portion of the wound electrode body 80) of the bag-shaped insulating film 10 into the above-described shape, the area of a gap which may be formed between the lower R portion of the wound electrode body 80 and the insulating film 10 facing the lower R portion can be minimized. By forming the shape of the bottom surface-forming portion (that is, the portion facing the lower R portion of the wound electrode body 80) of the bag-shaped insulating film into the above-described U-shape (curved shape), the corrugation or twisting of the insulating film 10 can be prevented when the entire surface of the lower R portion of the wound electrode body 80 and the insulating film 10 (typically, the portion facing the lower R portion of the wound electrode body 80) are joined to each other.

The bag-shaped insulating film 10 can be formed, for example, by folding the insulating film, which has been cut into a predetermined shape, into the above-described shape and assembling the folded insulating film into a bag shape. At this time, for example, the insulating film is cut into a shape (typically, an exploded shape of the bag-shaped insulating film) where portions (typically, portions of the narrow side surface-forming portions) of the insulating film overlap each other when being assembled into a bag shape, and the overlapping portions are bonded (fixed) to each other. As a result, the insulating film can be formed into a bag shape. Alternatively, plural sheets (parts) may be combined (bonded) to each other to be formed in the above-described bag shape. When the portions of the insulating film are bonded to each other, welding means such as spot welding, heat welding, ultrasonic welding, or laser welding can be appropriately used. Alternatively, the portions of the insulating film may be fixed to each other through, for example, an adhesive or a bonding agent as long as they can be sufficiently fixed to each other and there are no adverse effects (for example, internal short-circuiting) on battery performance. Here, typically, portions which are bonded (fixed) to each other during the formation of the insulating film 10 are liquid-tightly bonded to each other, and thus no through-hole is present in the bottom surface-forming portion of the insulating film 10. It is preferable that the bag-shaped insulating film 10 has a shape in which no through-hole is present in any region other than the upper opening. In other words, it is preferable that the bag-shaped insulating film 10 is formed such that the nonaqueous electrolytic solution in the bag-shaped insulating film does not flow out (leak) from the bonded portions of the insulating film and/or the bottom surface-forming portion of the insulating film to the outside. By forming the insulating film 10 into the above-described shape, the performance of holding the nonaqueous electrolytic solution in the electrode body can be further improved. Typically, it is preferable that the insulating film is formed such that the nonaqueous electrolytic solution injected into the bag-shaped insulating film does not flow out (leak) from the regions of the bag-shaped insulating film 10 other than the upper opening to the outside.

The inside (surface facing the wound electrode body) of the bottom surface-forming portion of the bag-shaped insulating film 10 is joined to the entire surface of the lower R portion 80R1 of the wound electrode body 80. That is, the entire surface of the lower R portion 80R1 of the wound electrode body 80 and the inside of the bag-shaped insulating film facing the lower R portion of the electrode body are joined to each other. Here, joining represents that the wound electrode body 80 and the insulating film 10 are coupled with each other so as not to be separated from each other and includes joining using welding (also called fusing) and joining using an adhesive or a bonding agent.

Here, the materials and members constituting the wound electrode body 80 (for example, the materials and members constituting the positive electrode 50, the negative electrode 60, and the separators 70) and the nonaqueous electrolytic solution may have the same configurations as in a nonaqueous electrolyte secondary battery (lithium ion secondary battery) of the related art without any particular limitation. A typical configuration will be described below.

<Positive Electrode 50>

The positive electrode 50 of the lithium ion secondary battery (nonaqueous electrolyte secondary battery) 100 according to the embodiment includes the positive electrode current collector 52; and the positive electrode active material layer 54 that is formed on the positive electrode current collector 52. As a material of the positive electrode current collector 52, a conductive material formed of highly conductive metal can be preferably used as in the case of a positive electrode current collector for a nonaqueous electrolyte secondary battery of the related art. For example, aluminum, nickel, titanium, or stainless steel, or an alloy containing the metal as a major component can be used. Among these, aluminum foil or the like is preferable. The positive electrode active material layer 54 contains at least a positive electrode active material. Preferable examples of the positive electrode active material include lithium composite metal oxides having a crystal structure such as a layered structure or a spinel structure (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and $LiFePO_4$). The positive electrode active material layer 54 may further contain components other than the positive electrode active material, for example, a conductive material or a binder. As the conductive material, for example, a carbon material such as carbon black (for example, acetylene black (AB)) or graphite may be preferably used. As the binder, for example, PVDF may be used.

First, the positive electrode active material and other optional materials are dispersed in an appropriate solvent (for example, N-methyl-2-pyrrolidone) to prepare a paste-like (slurry-like) composition. Next, an appropriate amount of the composition is applied to a surface of the positive electrode current collector 52 and then is dried. As a result, the positive electrode 50 can be formed. In addition, by optionally performing an appropriate pressing treatment, the characteristics (for example, average thickness, density, and porosity) of the positive electrode active material layer 54 can be adjusted.

<Negative Electrode 60>

The negative electrode 60 of the lithium ion secondary battery (nonaqueous electrolyte secondary battery) 100 according to the embodiment includes the negative electrode current collector 62; and the negative electrode active material layer 64 that is formed on the negative electrode current collector 62. As a material of the negative electrode current collector 62 constituting the negative electrode 60, a conductive material formed of highly conductive metal can be preferably used as in a current collector of a negative electrode for a nonaqueous electrolyte secondary battery of the related art. For example, copper, nickel, titanium, or stainless steel, or an alloy containing the metal as a major component can be used. Among these, copper foil or the like is preferable. The negative electrode active material layer 64 contains at least a negative electrode active material. As the negative electrode active material, one kind or two or more kinds may be used without any particular limitation among various known materials which can be used as a negative electrode active material of a nonaqueous electrolyte secondary battery. For example, a particulate carbon material (carbon particles) at least a part of which has a graphite structure (layered structure) can be preferably used. As the carbon material, graphite, any one of non-graphitizable carbon (hard carbon), graphitizable carbon (soft carbon), and a carbon material having a combination thereof can be preferably used. Among these, graphite particles (formed of natural graphite or artificial graphite) capable of obtaining high energy density can be preferably used. In addition, a surface of the carbon material (carbon material as a core) may be coated with an amorphous carbon film.

The negative electrode 60 can be manufactured, for example, using the same method as in the positive electrode 50. That is, the negative electrode active material and other optional materials are dispersed in an appropriate solvent (for example, ion exchange water) to prepare a paste-like (slurry-like) composition. Next, an appropriate amount of the composition is applied to a surface of the negative electrode current collector 62 and then is dried to remove the solvent. As a result, the negative electrode 60 can be formed. In addition, by optionally performing an appropriate pressing treatment, the characteristics (for example, average thickness, density, and porosity) of the negative electrode active material layer 64 can be adjusted.

<Separator 70>

The separator 70 has a function of insulating the positive electrode 50 (positive electrode active material layer 54) and the negative electrode 60 (negative electrode active material layer 64) from each other, a function of holding the nonaqueous electrolytic solution, and a shutdown function. Examples of the separator 70 include a porous sheet (film) formed of a resin such as polyethylene (PE), polypropylene (PP), polyester, cellulose, or polyamide. The porous sheet may have a single-layer structure or a laminate structure including two or more layers (for example, a three-layer structure in which a PP layer is laminated on both surfaces of a PE layer).

In the nonaqueous electrolytic solution, for example, an organic solvent (nonaqueous solvent) can contain a supporting electrolyte. As the nonaqueous solvent, various organic solvents used in an electrolytic solution of a general lithium ion secondary battery, for example, ethylene carbonate (EC), propylene carbonate (PC), diethyl carbonate (DEC), dimethyl carbonate (DMC), and ethyl methyl carbonate (EMC) can be used without any particular limitation. Among these nonaqueous solvents, one kind can be used alone, or two or more kinds can be appropriately used in combination. In particular, a nonaqueous solvent which contains EC having a high dielectric constant can be preferably used. As the supporting electrolyte, for example, a lithium salt such as $LiPF_6$, $LiBF_4$, or $LiClO_4$ (preferably, $LiPF_6$) can be used. The concentration of the supporting electrolyte is preferably 0.7 mol/L to 1.3 mol/L and is more preferably about 1.1 mol/L. Within a range where the effects of the invention do not significantly deteriorate, the nonaqueous electrolytic solution may further contain components other than the nonaqueous solvent and the supporting electrolyte described above. Examples of the components include various additives including: a gas producing agent such as biphenyl (BP) or cyclohexylbenzene (CHB); a film forming agent such as an oxalato complex compound, vinylene carbonate (VC), or fluoroethylene carbonate (FEC); a dispersant; and a thickener.

Hereinafter, in regard to a method of manufacturing a nonaqueous electrolyte secondary battery according to the invention, a preferable embodiment of a method of manufacturing the nonaqueous electrolyte secondary battery (lithium ion secondary battery) 100 having the above-described configuration will be described appropriately with reference to the drawings. However, the method of manufacturing a nonaqueous electrolyte secondary battery according to the invention is not intended to be limited to the following embodiment.

Figure 7:
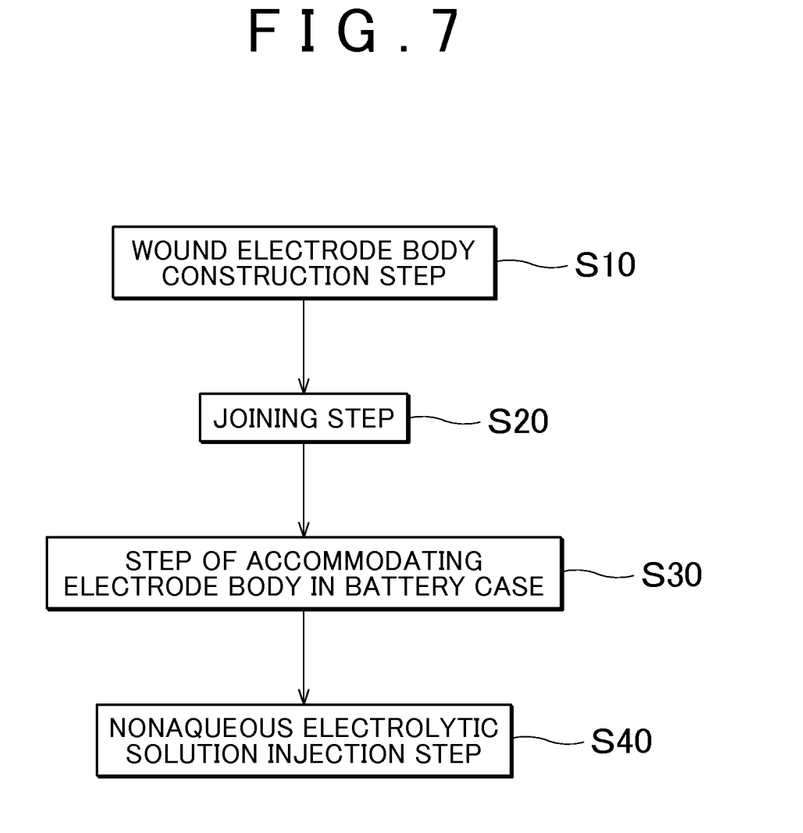
FIG. 7 is a flowchart showing a method of manufacturing the nonaqueous electrolyte secondary battery according to the embodiment.

As shown in FIG. 7, the method of manufacturing the nonaqueous electrolyte secondary battery 100 according to the embodiment includes a wound electrode body construction step S10, a joining step S20, an accommodating step S30 of accommodating the electrode body in the battery case, a nonaqueous electrolytic solution injection step S40. Hereinafter, the respective steps will be described in detail.

First, the wound electrode body construction step S10 will be described. In this step, the flat wound electrode body 80 is constructed by making the elongated positive electrode 50 and the elongated negative electrode 60 overlap each other with the elongated separator 70 interposed therebetween to obtain a laminate and winding the laminate in a longitudinal direction of the elongated positive electrode and the elongated negative electrode. The wound electrode body 80 has two R portions 80R1, 80R2 and a wide flat portion (80F), the two R portions have a curved surface and are formed in opposite end portions in a longitudinal direction of a section perpendicular to a winding axis, and the wide flat portion is a center portion in the longitudinal direction of the cross-section and is interposed between the two R portions.

The flat wound electrode body 80 may have the above-described configuration. The wound electrode body 80 can be formed into a flat shape, for example, by making the positive and negative electrodes and the separators overlap each other to obtain a laminate, winding the laminate to obtain a wound body, and squashing the wound body in a side surface direction (in a direction perpendicular to the winding axis WL). Alternatively, the wound electrode body 80 may be formed into a flat shape by making the positive and negative electrodes and the separator overlap each other to obtain a laminate and winding the laminate around a flat winding core.

Next, the joining step S20 will be described. In this step, the flat wound electrode body 80 constructed in the wound electrode body construction step S10 is accommodated in the bag-shaped insulating film 10, and an entire surface of one (R portion 80R1) of the two R portions 80R1, 80R2 of the wound electrode body 80 and an inside of the bag-shaped insulating film 10, which faces the R portion 80R1 of the electrode body 80, are joined to each other.

The wound electrode body 80 is accommodated in the bag-shaped insulating film 10 such that the flat portion 80F of the wound electrode body 80 faces the wide side surfaces of the insulating film 10 and such that the R portion 80R1 (the R portion which faces the bottom surface 39 of the battery case when accommodated in the battery case, that is, the lower R portion) of the wound electrode body faces the bottom surface-forming portion of the insulating film 10. As a method of accommodating the wound electrode body 80 in the bag-shaped insulating film 10 (covering the wound electrode body 80 with the insulating film 10), for example, the following method can be adopted including: forming the insulating film 10 into a bag shape corresponding to the shape of the wound electrode body 80; and inserting the wound electrode body 80 into the bag-shaped insulating film 10. At this time, the wound electrode body 80 can be inserted into the bag-shaped insulating film through the opening which is formed at an end of the bag-shaped insulating film 10. Alternatively, the wound electrode body 80 may be arranged at a predetermined position of the insulating film 10 which has been cut into a predetermined shape, and the insulating film 10 may be assembled (formed) into a bag shape in a state where the wound electrode body 80 is arranged. In the method of forming the insulating film into a bag shape after arranging the wound electrode body at a predetermined position, an operation of inserting the wound electrode body 80 into the flat bag-shaped insulating film 10 is not required. Therefore, for example, the insulating film 10 may not be damaged (broken or torn) by the wound electrode body 80.

The method of joining the entire surface of the R portion 80R1 of the two R portions 80R1, 80R2 of the wound electrode body 80 and the inside of the bag-shaped insulating film 10, which faces the R portion 80R1, to each other is not particularly limited as long as the wound electrode body 80 and the insulating film 10 can be joined to each other using this method. For example, joining using welding and joining using an adhesive force of an adhesive or a bonding force of a bonding agent can be preferably adopted.

The joining using welding refers to a method of pressing the molten insulating film 10 against the wound electrode body 80 to join them to each other. For example, the joining using welding is performed by heating the insulating film 10 while applying a pressing force to the insulating film 10 such that the portion of the insulating film 10 which is joined to the R portion 80R1 of the wound electrode body 80 (the inside of the bag-shaped insulating film 10 which faces the R portion 80R1 of the wound electrode body 80, that is, the portion of the bottom surface-forming portion of the insulating film 10 which faces the wound electrode body) is closely adhered to the wound electrode body 80. Although not particularly limited, the wound electrode body 80 and the insulating film 10 can be joined to each other, for example, using the following means. First, a pressing tool having a curved surface which corresponds to the shape of the R portion 80R1 of the wound electrode body 80 is prepared, and the insulating film 10 is arranged between the curved surface of the pressing tool and the R portion 80R1 of the wound electrode body 80. The pressing tool is pressed against the wound electrode body 80 at a predetermined pressing force in a direction which matches the longitudinal direction of the section perpendicular to the winding axis of the wound electrode body 80. As a result, the R portion 80R1 of the wound electrode body 80 and the insulating film 10 (typically, the bottom surface-forming portion of the insulating film 10) are closely adhered to each other. The insulating film 10 is heated to a predetermined temperature while maintaining a state where the insulating film 10 is pressed against the wound electrode body 80 using the pressing tool. As the welding method, a well-known welding method of the related art can be adopted without any particular limitation, and examples thereof include thermal welding (for example, hot plate welding or impulse welding), vibration welding, high-frequency welding, and ultrasonic welding.

When the wound electrode body 80 and the insulating film 10 are joined to each other through welding, the pressing force at which the insulating film 10 is pressed against the wound electrode body 80 is not particularly limited as long as the joining between the wound electrode body 80 and the insulating film 10 can be realized. For example, although it varies depending on, for example, the material of the insulating film 10 to be used, the pressing force is suitably about 100 kgf or higher (for example, 100 kgf to 500 kgf) and preferably 150 kgf or higher (for example, 150 kgf to 300 kgf). When the pressing force is excessively low, it is difficult to join the wound electrode body 80 and the insulating film 10 to each other, and when the pressing force is excessively high, the wound electrode body 80 may be damaged, which is not preferable. Here, 1 kgf refers to about 9.8 N. The preferable range of the pressing force is suitably about 950 N or higher (for example, 950 N to 5000 N) and is preferably 1400 N or higher (for example, 1400 N to 3000 N). When the wound electrode body 80 and the insulating film 10 are joined to each other through welding, the heating temperature of the insulating film 10 is not particularly limited as long as the joining between the wound electrode body 80 and the insulating film 10 can be realized. For example, the heating temperature may be about 60° C. or higher, and the heating time may be at least 0.1 seconds. Although the heating temperature and the heating time vary depending on, for example, the material of the insulating film 10 to be used, the heating temperature is suitably about 60° C. or higher (for example, 60° C. to 130° C.) and preferably 100° C. to 110° C. The heating time is suitably about 0.1 seconds or longer (for example, 0.1 seconds to 10 seconds) and preferably 0.5 seconds to 8 seconds (for example, 1 second to 5 seconds). When the pressing force, the heating temperature, and the heating time are within the above-described range, the insulating film 10 and the wound electrode body 80 can be appropriately joined to each other. When the heating temperature is excessively high or when the heating time is excessively long, the performance of the material constituting the electrode body may decrease (for example, the separator may be melted). On the other hand, when the heating temperature is excessively low or when the heating time is excessively short, the joining between the wound electrode body 80 and the insulating film 10 may be insufficient, which is not preferable.

As the adhesive or the bonding agent through which the wound electrode body 80 and the insulating film 10 are joined to each other, a well-known adhesive or a well-known bonding agent of the related art can be used without any particular limitation as long as the battery performance of the nonaqueous electrolyte secondary battery significantly deteriorates. For example, the adhesive or the bonding agent may be in various forms such as liquid, ink, paste, and slurry. It is preferable that the adhesive or the bonding agent is in the form of a tape (typically, a double-sided adhesive tape). In the embodiment of the invention, both the adhesive and the bonding agent can be preferably used, particularly, without being distinguished from each other. In a method of joining the wound electrode body 80 and the insulating film 10 to each other using the adhesive or the bonding agent, for example, the adhesive or the bonding agent is applied (for example, is coated or is pasted) to the surface of the R portion 80R1 of the wound electrode body 80 or to the surface of the region where the insulating film 10 is joined to the R portion 80R1 of the wound electrode body 80 (that is, the surface of the bottom surface-forming portion of the insulating film 10 which faces the wound electrode body), and the R portion 80R1 of the wound electrode body 80 and the insulating film 10 come into contact with each other. As a result, the wound electrode body 80 and the insulating film 10 can be joined to each other. Alternatively, when a hot-melt type adhesive or bonding agent is used, the wound electrode body 80 and the insulating film 10 may be joined to each other for example, by arranging the hot-melt type adhesive or bonding agent between the R portion 80R1 of the wound electrode body 80 and the insulating film 10, putting the wound electrode body 80 and the insulating film 10 into a mold having a shape corresponding to the shape of the R portion 80R1 of the wound electrode body, and heating the mold.

Next, the step S30 of accommodating the electrode body in the battery case will be described. In this step, the wound electrode body 80 to which the insulating film 10 is joined is inserted into the battery case 30. Specifically, the wound electrode body 80 and the insulating film 10 are inserted into the battery case 30 (case body 32) such that the R portion 80R1 of the two R portions 80R1, 80R2 of the flat wound electrode body 80, to which the insulating film 10 is joined, faces the bottom surface 39 of the battery case 30. The wound electrode body 80 and the insulating film are accommodated in the battery case 30 through the opening provided on the upper portion of the case body 32. As a result, the wound electrode body 80 and the insulating film 10 are accommodated in the flat internal space of the case body 32, and the insulating film 10 is arranged between the wound electrode body 80 and the inner wall of the battery case 30 (case body 32). After the insulating film 10 and the wound electrode body 80 are accommodated in the case body 32, the upper opening of the case body 32 is covered with the lid 34, a boundary between the case body 32 and the lid 34 is joined (sealed), for example, by welding (for example, by laser welding) the lid 34 to the periphery of the opening of the case body 32.

Next, the nonaqueous electrolytic solution injection step S40 will be described. In this step, the nonaqueous electrolytic solution is injected into the battery case 30 into which the wound electrode body 80 and the insulating film 10 are inserted. For example, the nonaqueous electrolytic solution may be injected into the battery case 30 through the injection hole provided on the lid 34 of the battery case. As the injecting method, a general injecting method of injecting the nonaqueous electrolytic solution into the battery case 30 during the preparation of a nonaqueous electrolyte secondary battery of the related art can be adopted. The nonaqueous electrolytic solution may have the above-described configuration. Typically, after the nonaqueous electrolytic solution is injected into the battery case 30, the liquid injection hole is sealed. The sealing can be performed, for example, by caulking the injection hole with a sealing plug and welding (for example, laser welding) the sealing plug to the injection hole. In this way, the lithium ion secondary battery 100 can be manufactured (constructed).

The nonaqueous electrolyte secondary battery according to the embodiment can be used for various applications and is characterized in that it is superior in the ability of holding the nonaqueous electrolytic solution in the electrode body and exhibits high cycle characteristics (in particular, high-rate cycle characteristics). That is, battery characteristics (typically, capacity retention) are high, and reliability is high. Accordingly, due to its characteristics, the nonaqueous electrolyte secondary battery according to the embodiment can be preferably used, for example, as a drive power supply mounted in a vehicle such as a plug-in hybrid vehicle (PHV), a hybrid vehicle (HV), or an electric vehicle (EV). According to the invention, there can be provided a vehicle including the nonaqueous electrolyte secondary battery disclosed herein, preferably, as a power source (typically, a battery pack in which plural secondary batteries are electrically connected to each other).

Hereinafter, test examples relating to the invention will be described. However, the descriptions of these test examples are not intended to limit the technical scope of the invention.

Using the following materials and processes, lithium ion secondary batteries (nonaqueous electrolyte secondary batteries) according to Example 1 (Example according to the invention) and Example 2 (Comparative Example) were constructed.

Example 1

The positive electrode was prepared in the following procedure. $LiNi_{0.33}Co_{0.33}Mn_{0.33}O_2$ (LNCM) as a positive electrode active material; AB as a conductive material; and PVDF as a binder were weighed at a mass ratio (LNCM: AB:PVDF) of 91:6:3. These weighed materials were mixed with N-methylpyrrolidone (NMP) to prepare a positive electrode active material layer-forming composition. This composition was applied in a belt shape to both surfaces of elongated aluminum foil (positive electrode current collector) was dried, and was pressed. As a result, a positive electrode was prepared.

The negative electrode was prepared in the following procedure. Graphite (C) as a negative electrode active material; SBR as a binder; and CMC as a thickener were weighed at a mass ratio (C:SBR:CMC) of 98:1:1. The weighed materials were mixed with ion exchange water. As a result, a negative electrode active material layer-forming composition was prepared. This composition was applied in a belt shape to both surfaces of elongated copper foil (negative electrode current collector), was dried, and was pressed. As a result, a negative electrode sheet was prepared.

The positive electrode and the negative electrode which were prepared using the above-described method were made to overlap each other in a longitudinal direction with two separators interposed therebetween, each of the separators having a three-layer structure in which a porous polypropylene layer was formed on both surfaces of a porous polyethylene layer. Next, the obtained laminate was wound in the longitudinal direction and then squashed. As a result, a flat wound electrode body was prepared.

Next, a bag-shaped insulating film was prepared which was formed into a bag shape corresponding to the shape of the flat wound electrode body prepared as described above. The bag-shaped insulating film was formed, for example, by folding the insulating film, which had been cut into a predetermined shape, into a predetermined shape and fixing a part of overlapping narrow side surface-forming portions by heat welding to assemble the insulating film into a bag shape. As the insulating film, a film formed of a thermoplastic resin having an average thickness of 50 μm was used.

The flat wound electrode body prepared as described was accommodated in the bag-shaped insulating film prepared as described above. Specifically, the electrode body was inserted into the insulating film through an opening of the insulating film such that one of R portions of the wound electrode body faced a bottom surface-forming portion of the insulating film.

Next, regarding the wound electrode body accommodated in the bag-shaped insulating film, the entire surface of the R portion (the R portion which faces the bottom surface-forming portion of the bag-shaped insulating film; lower R portion) of the two R portions and the inside of the insulating film (the bottom surface-forming portion of the insulating film) facing the R portion (lower R portion) of the electrode body were joined to each other. Here, a joint portion between the R portion (lower R portion) of the electrode body and the insulating film was heated to about 60° C. while applying a pressing force of about 100 kgf to the joint portion. As a result, the inside of the bag-shaped insulating film was welded to the electrode body, and the electrode body (the lower R portion of the wound electrode body) and the insulating film were joined to each other.

The wound electrode body to which the insulating film was joined as described above was accommodated in the battery case. Here, the electrode body and the insulating film were inserted into the battery case through the opening of the battery case such that the R portion (lower R portion) of the two R portions of the electrode body, to which the insulating film was joined, faced a bottom surface of the battery case. Next, a nonaqueous electrolytic solution was injected into the battery case in which the wound electrode body was accommodated. As a result, a battery according to Example 1 was constructed. As the nonaqueous electrolytic solution, a solution was used in which $LiPF_6$ as a supporting electrolyte was dissolved in a mixed solvent at a concentration of 1.1 mol/L, the mixed solvent containing ethylene carbonate (EC), dimethyl carbonate (DMC), and ethyl methyl carbonate (EMC) at a volume ratio (EC:DMC:EMC) of 30:40:30.

Example 2

A nonaqueous electrolyte secondary battery according to Example 2 (Comparative Example) was prepared using the same material and process as in Example 1, except that the R portion (lower R portion) of the wound electrode body and the insulating film facing the R portion (lower R portion) were not joined to each other.

[Measurement of Initial Resistance (IV Resistance)]

Next, the initial resistance (IV resistance) of each of the batteries prepared as described above was measured. First, CC charging was performed until the state of charge (SOC) reached 60%. Next, in a temperature condition of −10° C., CC charging was performed on each of the batteries with the adjusted SOC of 60% at a charging rate of 10 C for 10 seconds. At this time, a value (V) of voltage increase was measured. The measured value (V) of voltage increase was divided by the corresponding current value to calculate an IV resistance (mΩ), (typically, the IV resistance (mΩ) was calculated from a slope of a linear approximation line of a current (I)-voltage (V) plot value), and the average thereof was obtained as an initial resistance.

[Charging-Discharging Cycle Test]

After the initial IV resistance was measured, the following charging-discharging cycle test was performed on each of the batteries according to the examples. After the test, the IV resistance was measured to evaluate durability. Specifically, CC charging was performed at a charging rate of 35 C for 10 seconds, and then this charging operation was stopped for 5 seconds. Next, CC discharging was performed at a discharging rate of 35 C for 10 seconds, and then this discharging operation was stopped for 5 seconds. These charging and discharging operations were set as one cycle and were repeated. The resistance of each of the batteries was measured using the same method as in the initial resistance measurement per 100 charging-discharging cycles. Based on the results, a resistance increase was calculated from the following expression Resistance Increase (%)=Battery Resistance (IV Resistance) after Cycles÷Initial Resistance (IV resistance)×100

Figure 8:
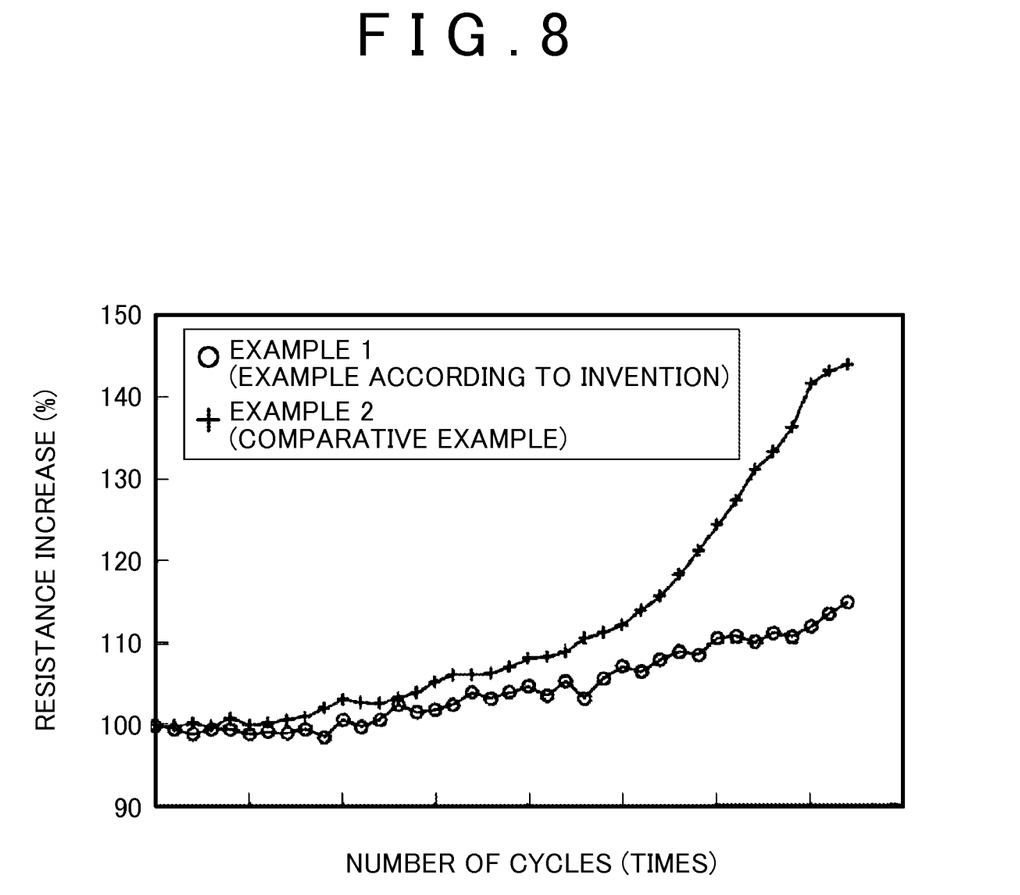
FIG. 8 is a graph showing a change in resistance increase when a charging-discharging cycle test was performed on a nonaqueous electrolyte secondary battery according to an example.

FIG. 8 shows a graph in which a resistance increase (%) of each of the batteries according to the examples was plotted per 100 cycles.

As shown in FIG. 8, in the nonaqueous electrolyte secondary battery according to Example 1 (Example according to the invention), an increase in resistance caused by repeated charging and discharging was suppressed compared to the nonaqueous electrolyte secondary battery according to Example 2 (Comparative Example). That is, regarding the nonaqueous electrolyte secondary battery in which the flat wound electrode body accommodated in the insulating film and the nonaqueous electrolytic solution were accommodated in the battery case, it was found that the durability of the battery (typically, cycle characteristics; specifically, high-rate cycle characteristics) can be improved by joining the entire surface of the lower R portion of the wound electrode body and the inside of the bag-shaped insulating film facing the lower R portion of the electrode body. The reason for this is presumed to be as follows: by accommodating the flat wound electrode body in the bag-shaped insulating film and joining the entire surface of the lower R portion of the wound electrode body and the inside of the bag-shaped insulating film, facing the lower R portion of the electrode body, to each other, the ability of holding the nonaqueous electrolytic solution in the electrode body can be improved, and an appropriate amount of the nonaqueous electrolytic solution can be held in the electrode body even when charging and discharging were repeated. It can be seen from the results that, according to the technique disclosed herein, a nonaqueous electrolyte secondary battery having high ability of holding the nonaqueous electrolytic solution in the electrode body, and a method of manufacturing the battery can be provided.

Hereinabove, specific examples of the invention have been described in detail. However, these examples are merely exemplary and do not limit the invention. The invention includes various modifications and alternations of the above-described specific examples.

What is claimed is:

1. A nonaqueous electrolyte secondary battery comprising:
   a flat wound electrode body that is formed by making an elongated positive electrode and an elongated negative electrode overlap each other with an elongated separator interposed therebetween to obtain a laminate and winding the laminate in a longitudinal direction of the elongated positive electrode and the elongated negative electrode, in which the electrode body has two R portions and a flat portion, the two R portions have a curved surface and are formed in opposite end portions in a longitudinal direction of a section perpendicular to a winding axis, and the flat portion is a center portion in the longitudinal direction of the section and is interposed between the two R portions;
   a nonaqueous electrolytic solution;

a quadrilateral battery case that accommodates the flat wound electrode body and the nonaqueous electrolytic solution; and an insulating film that electrically insulates the flat wound electrode body and the quadrilateral battery case from each other, that is formed into a bag shape corresponding to a shape of the electrode body, the insulating film being closed at a lower end thereof and having an opening at an upper end thereof, wherein the flat wound electrode body is accommodated in the insulating film through the opening, wherein the insulating film is arranged between an inner wall of the quadrilateral battery case and the flat wound electrode body, wherein only an entire surface of a bottom-side R portion of the two R portions of the flat wound electrode body and a portion of an inside of the insulation film are joined to each other;

wherein the bottom-side R portion of the two R portions of the flat wound electrode body faces a bottom surface of the quadrilateral battery case, and the portion of the inside of the insulating film faces the bottom-side R portion of the two R portions of the flat wound electrode body, and wherein the entire surface of the bottom-side R portion of the two R portions of the flat wound electrode body is directly welded to the portion of the inside of the insulating film, which faces the bottom-side R portion of the two R portions of the flat wound electrode body.

\* \* \* \* \*